United States Patent [19]

Gersch et al.

[11] 4,071,202

[45] Jan. 31, 1978

[54] ROLL FILM CASSETTE

[75] Inventors: Josef Gersch, Unterhaching; Otto Wiedemann, Starnberg, both of Germany

[73] Assignee: AGFA-Gevaert, AG, Leverkusen, Germany

[21] Appl. No.: 775,983

[22] Filed: Mar. 9, 1977

[30] Foreign Application Priority Data

Mar. 12, 1976 Germany ............................ 7607694

[51] Int. Cl.$^2$ ............................................... G03B 1/04

[52] U.S. Cl. ................................................. 242/71.1

[58] Field of Search ........................ 242/71.1, 71.7, 71

[56] References Cited

U.S. PATENT DOCUMENTS

| | | | |
|---|---|---|---|
| 1,794,426 | 3/1931 | Taylor | 242/71.1 |
| 2,019,672 | 11/1935 | Goodhond | 242/71.1 |
| 2,072,625 | 3/1937 | Rose | 242/71.1 |
| 2,172,255 | 9/1939 | Nagel | 242/71.1 |

*Primary Examiner*—Edward J. McCarthy
*Attorney, Agent, or Firm*—Michael J. Striker

[57] ABSTRACT

A roll film cassette has a tubular wall provided with an axially extending film slot. At least one open axial end of the tubular wall is provided with an axially projecting rib. A cover for this open end is formed with an annular recess in which the rib is receivable to form with the cover a labyrinth-type light seal; the recess is interrupted at one location by a projection which enters into the film slot when the cover is in position closing the open end.

5 Claims, 1 Drawing Figure

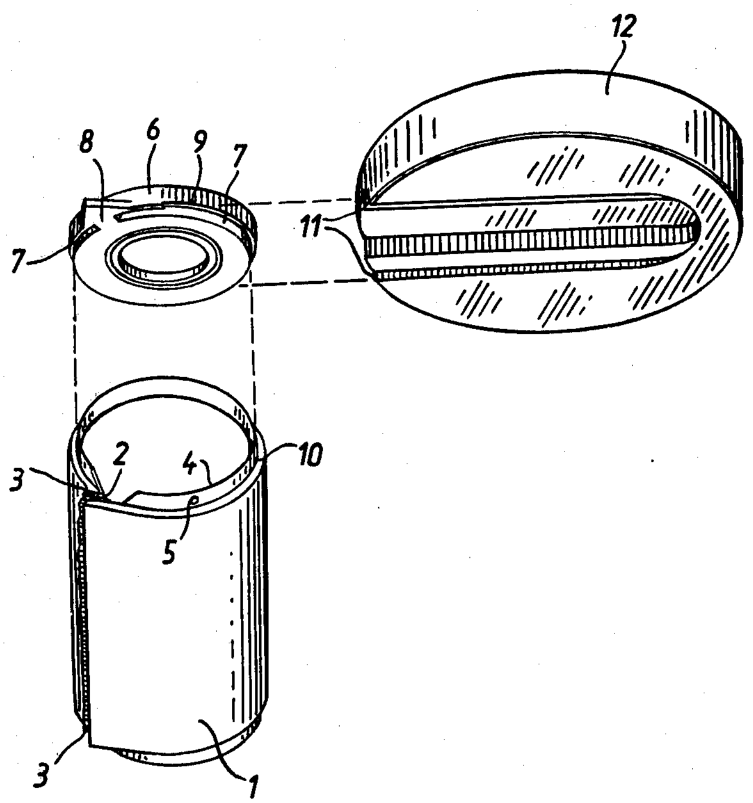
12
8
6
9
7
7
11
3
2
4
10
5
3
1

ROLL FILM CASSETTE

BACKGROUND OF THE INVENTION

This invention relates to a film cassette and in particular to a cassette for roll film.

Roll film is supplied in cassettes having in their circumferential wall an axially extending slot through which the film is incrementally withdrawn by the camera mechanism from the film coil inside the cassette. The film is wound onto a spool in the camera. When the film length is used up, i.e., when all exposures are made, the film is retracted into the cassette by reversing the film winding direction, and the cassette is then ready to be opened for removal of the film for developing of the same.

Such cassettes are conventionally either constructed as a can having one permanently closed axial end and one open end which is provided with a cover, or else the tubular wall has both of its axial ends open and each of these ends is provided with a separate cover.

The known cassettes of this type have certain disadvantages, including the fact that they require relatively elaborate measures to prevent the entry of light into the cassette where the cover (or covers) joins the tubular wall. Also, the removal of the cover for extraction of the exposed film is not always easy and there is no way to assure that the width of the film slot does not vary. If the slot width varies, this results either in entry of light, or, conversely, in the exertion of a retarding action on the film — depending upon whether the slot undergoes spreading or compression.

SUMMARY OF THE INVENTION

It is an object of the invention to provide an improved roll film cassette which is not possessed of the aforementioned disadvantages.

A more particular object is to provide a roll film cassette in which a light seal is obtained in a simple, but highly reliable manner, between the tubular wall and the cover or covers of the cassette.

A further object is to provide such a cassette in which the cover or covers can be readily detached for removal of the exposed film.

Still a further object is to provide a roll film cassette having an arrangement for mechanically fixing the width of the film slot against variations.

In pursuance of these objects, and others which will become apparent hereafter, one aspect of the invention resides in a roll film cassette which, briefly stated, comprises a casing having a tubular wall provided with an axially extending film slot and with an open axial end bounded by an axially projecting circumferential rib; and a cover for the open axial end, the cover being provided with a circumferentially extending recess into which the rib is adapted to enter so as to form with the cover a labyrinth-type light seal, the recess being in circumferential direction interrupted at a location where the cover is formed with a projection which enters into the film slot adjacent the open axial end.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BREIF DESCRIPTION OF THE DRAWING

The single FIGURE is an exploded perspective view, showing a roll film cassette according to the invention as well as a cover-removing tool.

DESCRIPTION OF A PREFERRED EMBODIMENT

The FIGURE shows a novel roll film cassette in an exploded view. In addition, it illustrates a tool for removing the cover of the cassette; this is done for a better understanding of the inventive concepts but the tool itself does not form part of the invention.

The cassette has a tubular or circumferential wall 1 which is provided with a longitudinally (i.e., axially) extending film slot 2 through which roll film (not shown) is withdrawn in a camera for purposes of making exposures and through which the same film is subsequently retracted again into the space bounded by the wall. To avoid the entry of light through slot 2 the opposite sides thereof are bounded by sealing strips 3, e.g., strips of synthetic plastic, felt or the like, which engage the film.

Both axial ends of the tubular wall 1 may be closed by covers 6, or, as illustrated, one axial end may be permanently closed by a bottom wall which forms with the tubular wall 1 a "film can".

The respective open axial end of wall 1 is provided with an axially projecting circumferential rib 4 which is interrupted at the film slot 2. At its juncture with wall 1 the rib 4 defines with the same an annular shoulder 10.

A cover 6 closes the open end after the unexposed film (not shown) has been inserted into the cassette. Cover 6 has a circumferential recess or groove 7 into which the rib 4 enters as the cover 6 is put in place. Thus, the cover (or rather the groove 7) and the rib 4 together form a labyrinth seal which prevents the entry of light; this manner of establishing the seal is both simple and highly effective.

Groove 7 is circumferentially incomplete, being interrupted at one location. At this location the cover 6 is formed with a projection 8 having a width corresponding to the preselected width of the film slot 2. When the cover is put in place the projection enters into the film slot 2 and thus fixes the same against variations in width.

The cover 6 has a circumferential edge portion provided with the face 9; this edge portion and face 9 bound the groove 7 at is radially outer side. However, the axial height or length of face 9 is smaller than the corresponding dimension of rib 4 so that when the cover 6 is in place, the shoulder 10 and the edge of the face 9 which is located adjacent to it, are spaced apart in axial direction of the wall 1 and define with one another a circumferential gap. When the cover 6 is to be later removed for extraction of the exposed film, wedge-shaped ribs 11 of the illustrated tool 12 (or analogous portions of a similar tool) can enter into this gap and force the cover 6 off the wall 1 in a simple manner.

The cover 6 and the wall 1 may be of various materials, including metal. If they are of synthetic plastic material, as is conventional in this field, then they can be welded together (e.g., by ultrasonic welding) after the unexposed film has been inserted into the cassette, so as to prevent their accidental undesired separation.

In lieu of such welding (or e.g., adhesive bonding) the rib and the cover may be provided with cooperating snap-action couplings. For example, rib 4 may be provided with circumferentially distributed projections 5 as shown, and cover 6 may have mating depressions into which these projections can snap. A reversal of this arrangement is evidently also possible. Equally, such couplings may be employed in addition to the securing of cover 6 by ultrasonic welding or other types of bonding. The rib 4 is elastically yieldable so that the wedge action resulting from the insertion of the ribs 11 of tool 12 automatically causes the couplings to snap apart.

While the invention has been illustrated and described as embodied in a roll film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A roll film cassette, comprising a casing having a tubular wall provided with an axially extending film slot and with an open axial end bounded by an axially projecting circumferential rib; and a cover for said open axial end, said cover being formed with a projection which enters into said film slot adjacent said open axial end and also being provided with a circumferentially extending recess into which said rib is adapted to enter so as to form with said cover a labyrinth-type light seal, said recess being in a circumferential direction interrupted at the location where the cover is formed with said projection.

2. A roll film cassette as defined in claim 1, wherein said cover has a circumferential edge face in part located outwardly adjacent said recess.

3. A roll film cassette as defined in claim 2, said rib and said tubular wall defining with one another a circumferentially extending shoulder, and said edge face of said cover having in axial direction of said tubular wall a length which is smaller than the length of said rib in the same direction so that, when said cover is in position closing said open axial end, said edge face and said shoulder define with one another a circumferential gap into which a cassette-opening tool may enter when the cover is to be detached for the removal of film from said casing.

4. A roll film cassette as defined in claim 1, wherein said rib is elastically yieldable.

5. A roll film cassette as defined in claim 1, wherein said tubular wall and said cover are of synthetic plastic material and are connected to one another.

* * * * *